(12) United States Patent
Veenhof

(10) Patent No.: US 7,798,310 B2
(45) Date of Patent: Sep. 21, 2010

(54) CONVEYOR BELT CLEANER INCLUDING A SCRAPER BLADE MOUNTING APPARATUS HAVING A BIASING MEMBER

(75) Inventor: Willem D. Veenhof, Brevard, NC (US)

(73) Assignee: Martin Engineering Company, Neponset, IL (US)

( * ) Notice: Subject to any disclaimer, the term of this patent is extended or adjusted under 35 U.S.C. 154(b) by 556 days.

(21) Appl. No.: 11/614,739

(22) Filed: Dec. 21, 2006

(65) Prior Publication Data

US 2007/0137984 A1 Jun. 21, 2007

Related U.S. Application Data

(60) Provisional application No. 60/752,509, filed on Dec. 21, 2005.

(51) Int. Cl.
*B65G 45/16* (2006.01)
(52) U.S. Cl. ........................................ 198/499; 198/497
(58) Field of Classification Search .................. 198/499
See application file for complete search history.

(56) References Cited

U.S. PATENT DOCUMENTS

| | | | |
|---|---|---|---|
| 1,036,125 A | 8/1912 | King | |
| 1,831,531 A | 11/1931 | Harber | |
| 2,466,644 A | 4/1949 | McBride | |
| 2,549,718 A | 4/1951 | Spang | |
| 3,315,794 A | 4/1967 | Ellington | |
| 3,342,312 A | 9/1967 | Reiter | |
| 3,656,610 A | 4/1972 | McWilliams | |
| 3,674,131 A | 7/1972 | Matson | |
| 3,841,470 A | 10/1974 | Meguro | |
| 3,994,384 A | 11/1976 | Reiter | |
| 4,036,351 A | 7/1977 | Reiter | |
| 4,036,354 A | 7/1977 | Reiter | |

(Continued)

FOREIGN PATENT DOCUMENTS

DE     3742583 C1     5/1989

(Continued)

OTHER PUBLICATIONS

Communication Relating to the Results of the Partial International Search, Annex to Form PCTISA206.

(Continued)

*Primary Examiner*—Gene Crawford
*Assistant Examiner*—Kavel P Singh
(74) *Attorney, Agent, or Firm*—Thompson Coburn LLP; Clyde L. Smith

(57) ABSTRACT

A conveyor belt cleaner for scraping material from a surface comprising a mounting assembly operatively attached to a support frame, the mounting assembly comprising at least one scraper blade, a biasing member associated with each scraper blade and a scraper blade arm extending there between. The biasing member and scraper blade arm are configured such that the conveyor belt cleaner provides for full circle deflection of and a floating point of rotation for the base member, scraper blade arm, and scraper blade. The mounting assembly is further configured to enable material cleaned from the conveyor belt surface to pass freely through the mounting assembly to avoid inhibiting the operation of the conveyor belt cleaner.

4 Claims, 13 Drawing Sheets

U.S. PATENT DOCUMENTS

| | | | |
|---|---|---|---|
| 4,053,045 A | 10/1977 | Reiter | |
| 4,280,616 A | 7/1981 | Wadensten | |
| 4,365,706 A | 12/1982 | Bright | |
| 4,529,084 A | 7/1985 | Zhang | |
| 4,535,883 A | 8/1985 | Kerr | |
| 4,633,999 A | 1/1987 | Perneczky | |
| 4,694,952 A | 9/1987 | Meijer | |
| 4,696,389 A | 9/1987 | Schwarze | |
| 4,825,996 A | 5/1989 | Davidts | |
| 4,877,122 A * | 10/1989 | Morin | 198/499 |
| 4,962,845 A | 10/1990 | Gibbs | |
| 4,969,314 A * | 11/1990 | Davis | 53/572 |
| 5,082,106 A | 1/1992 | Schwarze | |
| 5,798,411 A | 8/1998 | Riazi | |
| 6,082,524 A | 7/2000 | Brink | |
| 6,152,290 A | 11/2000 | Mott et al. | |
| 6,227,350 B1 | 5/2001 | Yoshizako et al. | |
| 6,283,274 B1 | 9/2001 | Dolan et al. | |
| 6,457,575 B2 | 10/2002 | Swinderman | |
| 6,581,754 B2 | 6/2003 | Law | |
| 6,874,616 B2 | 4/2005 | DeVries et al. | |
| 2003/0066738 A1 | 4/2003 | Veenhof | |
| 2005/0023110 A1 | 2/2005 | Brink | |

FOREIGN PATENT DOCUMENTS

| | | | |
|---|---|---|---|
| EP | 0893377 A1 | | 1/1999 |
| EP | 1302417 A1 | | 4/2003 |
| JP | 63218420 A | * | 9/1988 |
| JP | 10265029 | | 10/1998 |

OTHER PUBLICATIONS

The International Search Report mailed Sep. 14, 2007, in International Application No. PCT/US2006/048778.

* cited by examiner

CONVEYOR BELT CLEANER INCLUDING A SCRAPER BLADE MOUNTING APPARATUS HAVING A BIASING MEMBER

This application claims the benefit of U.S. provisional patent application Ser. No. 60/752,509, filed Dec. 21, 2005, of which is incorporated herein by reference.

FIELD OF THE INVENTION

The present invention is directed to a conveyor belt cleaner including a scraper blade mounting assembly having a biasing member for resiliently mounting one or more scraper blades to a support member and biasing the scraper blade into scraping engagement with the conveyor belt surface.

BACKGROUND OF THE INVENTION

Scraper blades are used in conveyor belt cleaning mechanisms to remove material that adheres to the belt surface after the material has passed the material discharge point of the conveyor. It is advantageous to provide the scraper blade with a range of motion which allows the scraper blade to follow the obstruction to allow the obstruction to: pass over the blade without significant change in biasing forces and without causing damage to the scraper blade or to the surface; and to also enable the scraper blade to follow any undulations in the surface to be cleaned to provide substantially continuous removal of material from the surface. A scraper blade is provided with a range of motion by providing the scraper blade with one or more pivot points, or one or more pivot axes, about which the scraper blade may pivot. A biasing mechanism is provided that will return the scraper blade to its original scraping orientation if the scraper blade is pivoted away from the surface by engagement with a fixed obstruction in order to maintain relatively continuous scraping engagement with the surface.

Conventional conveyor belt cleaning devices generally include one or more scraper blades disposed in a plane transverse to the conveyor belt surface and are urged toward the conveyor belt so as to cause engagement of a scraping edge of the blade against the conveyor belt surface. Such conveyor belt cleaning devices are often located rearward of the head pulley drum on the return path of the conveyor belt so that sufficient flexibility in the belt is provided to permit transverse movement thereof when protruding objects pass the cleaning device, such as a mechanical splice in the conveyor belt. The cleaning angle of a scraper blade, which is the angle between the surface of the conveyor belt and the face of the scraper blade that faces the oncoming belt, may be an acute angle of less than 90 degrees, a right angle of 90 degrees, or an obtuse angle of greater than 90 degrees. As used hereinafter, "obtuse angle" shall include a right angle of 90 degree.

When a scraper blade is orientated with respect to the conveyor belt surface at an obtuse angle, it is referred to as the "peeling" angle. When a scraper blade is orientated with respect to the conveyor belt surface at an acute angle, it is referred to as the "scraping" angle. It has been found that scraper blades used in connection with conveyor belts conveying certain bulk materials with fines, such as ores, clean the conveyor belt more efficiently when the scraper blades are orientated at a peeling or obtuse angle with respect to the conveyor belt, rather than at a scraping or positive angle.

While an obtuse cleaning angle is preferable, from an efficiency point of view, over an acute cleaning angle, and a resiliently mounted blade is preferable to a rigidly mounted blade, resiliently mounted scraper blades having an obtuse cleaning angle can be subject to destructive and cleaning efficiency reducing vibration at the scraping edge of the scraper blade. When a scraper blade is engaged against the belt surface, a rotational moment is created in the scraper blade by the drag of the belt over the edge of the scraper blade. When pressed against a conveyor belt with a predetermined force to generate a predetermined cleaning pressure, a resiliently mounted scraper blade arm having an acute angle will rotate in a direction away from the belt surface, thus reducing the drag force created by the belt. This results in a comparatively small rotation and consequently only a small change in orientation from the scraper blade's natural orientation, thus producing a relatively stable and constant relationship between the blade and the belt surface with little or no resulting scraper blade vibration.

When a resiliently mounted scraper blade has an obtuse angle and an obtuse scraper blade arm where the primary point of contact is ahead of the behind scraper blade arm, and is applied against the belt with the same predetermined cleaning pressure, it will rotate in a direction toward the belt surface, thereby increasing the drag force. The increasing drag force will cause a reaction, wherein the blade and blade support mechanism to rotate away from the belt surface. Once again, the predetermined cleaning pressure will cause the blade arm to again rotate toward the belt surface, increasing the drag force. This unstable fluctuating relationship between the blade and the belt surface is seen as vibration of the scraping edge of the scraper blade relative to the belt surface, which is undesirable and destructive to the scraper blade and conveyor belt surface.

Another problem that is encountered by both peeling angle and scraping angle conveyor belt cleaners is the tendency of the conveyor belt cleaner or the belt to become damaged when the conveyor belt reverses direction or "rolls back" momentarily. Conveyor belt reversal or roll back happens frequently when the conveyor belt goes through a normal shutdown sequence. The belt thereafter rolls backward from a few inches to a few feet as the belt tension relaxes. This roll back motion tends to catch the scraper blade, forcing the blade to arc and bending the arm on which the scraper blade is mounted, or otherwise causing the scraper blade to swivel out of alignment. Roll back is particularly damaging when the scraper blades do not swivel back into their original cleaning position when the conveyor belt is restarted, or the damage to the scraper blade mounting assembly is so severe that the belt cleaner no longer functions properly. Even worse is the potential for damaging the belt when it resumes forward motion if the scraper blade is locked in a position where only a corner of the scraper blade is in engagement against the belt.

A common situation in which conveyor belt damage occurs frequently is in an inclined conveyor that is shut down with a load on the belt. The load tends to pull the conveyor in a reverse direction, sliding downhill. To prevent the belt from running away downhill with a load on it, a device called a "hold-back" is incorporated either onto the shaft that drives the pulley or within the gearing. The hold-back device does not operate with 100% efficiency, and it is common for the belt to creep backward. A very short distance of creep back or roll back, for example, ⅛ inch of roll back, is sufficient to impose tremendous loads on the scraper blades since the scraper is usually working at an angle to the conveyor belt. Such compression loads will damage the weakest link first, with the weakest link usually being the scraper blades. If the scraper blade is solid and strong enough, it will cause tearing damage to the conveyor belt. Because of this condition, most conveyor belt cleaners are designed to engage an unsupported section of the belt after it has left the pulley. In such arrangements, the belt does not have a solid backing, and the belt itself can lift, thereby relieving the forces that would be imposed on the scraper in response to a reversing condition.

In conventional belt cleaners, a scraper blade is preferably mounted on a support member by a mounting apparatus which provides a controlled range of motion to the scraper blade, and which provides a sufficient range of motion in multiple axes to enable the scraper blade to follow surface undulations and to also enable obstructions to pass over the scraping edge and scraper blade without generating forces applied to the scraper blade that are sufficient in magnitude to cause damage to the blade or the surface to be scraped, or to cause the scraper blade to resonate against the surface.

The provision of a biasing or tensioning force to a scraper blade in conventional belt cleaners to maintain scraping engagement with a surface has been achieved by the use of counter-weights, springs, air bags such as gas-filled shock absorbers, and liquid filled devices, that act in either compression, tension or torsion to pivot or otherwise move the scraper blade into scraping engagement with the surface. These devices provide a return biasing force, which returns the scraper blade to its original scraping orientation, that increases in magnitude as the scraper blade is increasingly displaced from its scraping position or unbiased rest position. However, many of these prior art cleaners can easily get into a resonance state because the resistance friction (which, in the known cleaners, is normally only the friction of the bearings supporting the lever arm) are small compared to the cleaning force.

Accordingly, despite numerous variations within the known art for mounting a scraper blade to a support member, a need still exists for a conveyor belt cleaner having a scraper blade mounting apparatus which will resiliently maintain the scraper blade in biased scraping engagement with the surface to be cleaned with a relatively constant biasing force, while not causing damage to the scraper blade or to the surface being cleaned.

SUMMARY OF THE INVENTION

The present invention is an improvement over the prior art conveyor belt cleaners in that the way that the conveyor belt cleaner provides: full circle deflection of the scraper blade arm, scraper blade and base member; a passage to permit materials to pass through the pocket housing the biasing member; and an insert member that may be positioned within the end of the scraper blade arm to provide the scraper blade in a scraping position or a peeling position.

In one embodiment, the conveyor belt cleaner of the present invention comprises a scraper blade arm having a scraper blade associated with a first end and a base member associated with the second end, and a corresponding mounting assembly that includes a biasing member and a pocket or cavity for receiving and housing the biasing member. The mounting assembly is operatively mounted between opposing ends of a first support frame member and a second support frame member aligned along a common, central axis. The pocket is defined by four sides, a top and a bottom, wherein at least two of the four sides, top and bottom provide a passage to enable material cleaned from the conveyor belt surface to pass there through.

A closure gate having a slot therein may extend across part of the front side of the cavity to enable the scraper blade arm to extend through the slot and travel there along. With the base member overlaying one end of the biasing member within the cavity, the biasing member enables the base member, scraper blade arm, and scraper blade to pivot about a first, pitch axis that is parallel to the central axis of the support frame, and a second, roll axis that is generally horizontal and perpendicular to the central axis of the support frame. The base member, scraper blade arm and scraper blade also have a limited ability to pivot about a third, yaw axis that is vertical and perpendicular to the central axis of the support frame. Pivoting of the base member about the yaw axis is limited by the ends of the base member encountering and abutting the sides defining the pocket. Thus, the conveyor belt cleaner provides for full circle deflection of and a floating point of rotation for the base member, scraper blade arm, and scraper blade.

In one embodiment, the base member is sized so that the front and rear edges of the base member frictional engage the closure gate and top plate of the pocket when the scraper blade arm and base member rotate about the floating point of rotation. The friction between the base member and the top plate and closure gate retards the motion of the scraper blade arm on its return to a cleaning position, thereby preventing the cleaners from getting into a resonance state.

The scraper blade may also be included in an insert member that includes a base for seating in an opening in the end of the scraper blade arm in a first position such that the scraper blade provides a rake angle for scraping or a negative rake angle for peeling.

It is therefore an object of the present invention to provide a new and improved conveyor belt cleaner.

Another object of the present invention is to provide a new and improved conveyor belt cleaner that permits materials to pass there through.

It is yet another object of the present invention to produce a conveyor belt cleaner that provides a floating point of rotation for the scraper blade arm.

Yet another object of the present invention is to provide a conveyor belt cleaner that provides for frictional dampening of the return force of the biasing member.

It is still another object of the present invention to provide an insert for a conveyor belt cleaner that can provide a scraper blade in a scraping position or a peeling position.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWING FIGURES

DETAILED DESCRIPTION OF THE INVENTION

Figure 1:
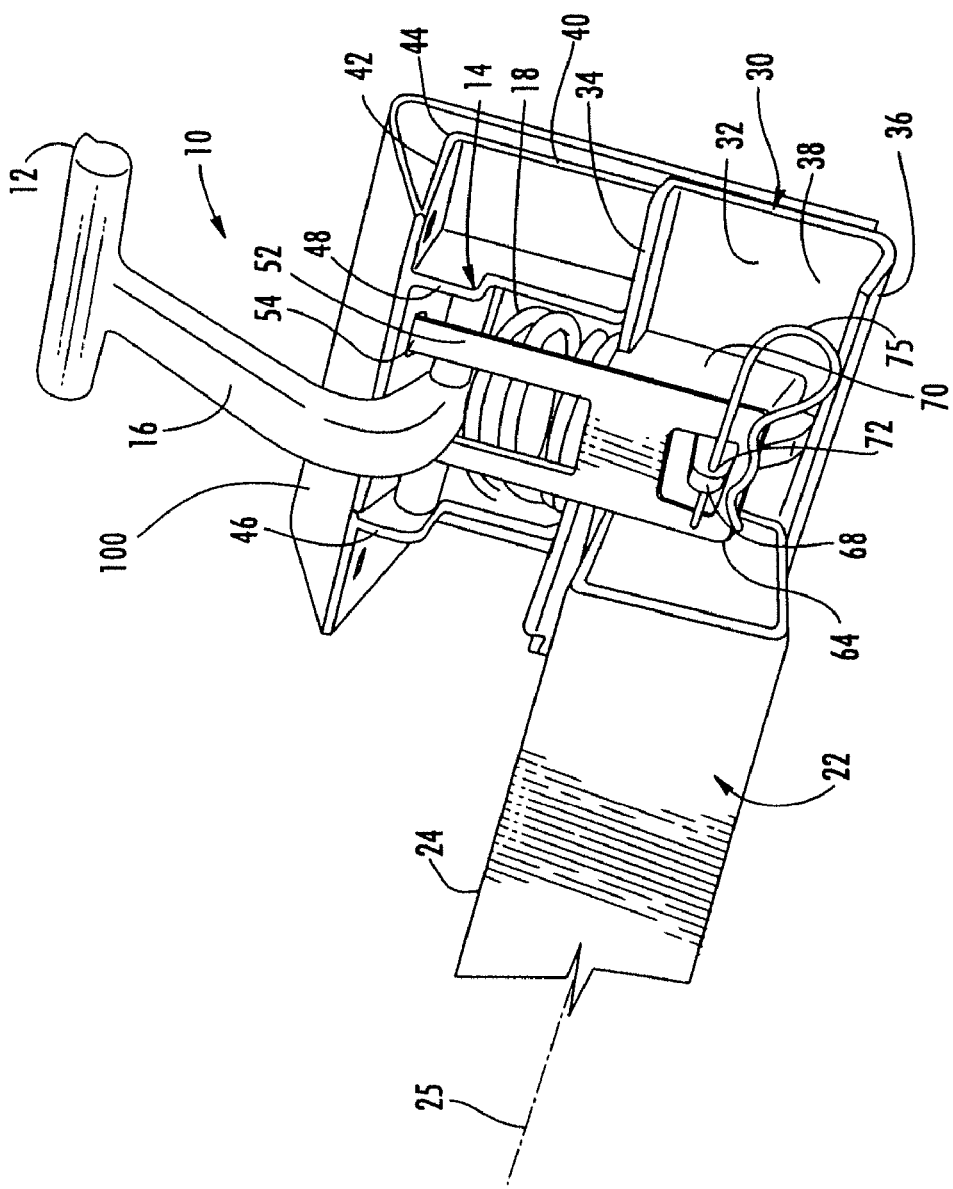
FIG. 1 is a rear perspective view of a conveyor belt cleaner according to the present invention.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Figure 14:
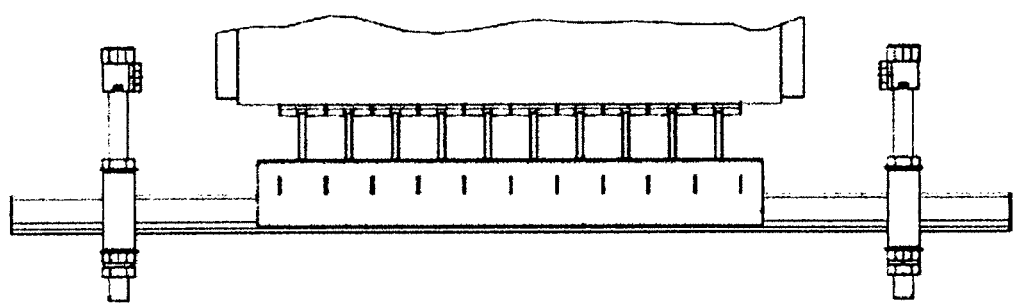
FIG. 14 is a elevated view of a conveyor belt assembly of the present invention having a series of mounting assemblies.

FIGS. 1-11 and 13 show an embodiment of a conveyor belt cleaner 10 of the present invention being configured for use as: a primary belt cleaner, where the scraping edge 90 engages the conveyor belt surface 92 at a supported point around the head pulley; and a secondary belt cleaner, where the scraping edge 90 engages the conveyor belt surface 92 at an unsupported point on the return side of the conveyor belt. Preferably, at least a first scraper blade 12 and corresponding mounting assembly 14, comprising a scraper blade arm 16, biasing member 18, and a pocket or cavity 20 for receiving the biasing member 18, is operatively mounted to a support frame 22, and, specifically, is disposed between opposing ends of a first support frame member 24 and a second support frame member (not shown) aligned along a common, central axis 25. The number of scraper blades and corresponding mounting assemblies used correlates to the width of each scraper blade and the width of the conveyor belt or the width of the area of the conveyor belt to be cleaned. FIG. 14 illustrates one embodiment of a number of mounting assemblies and scraper blade arms arranged in series.

Figure 12:
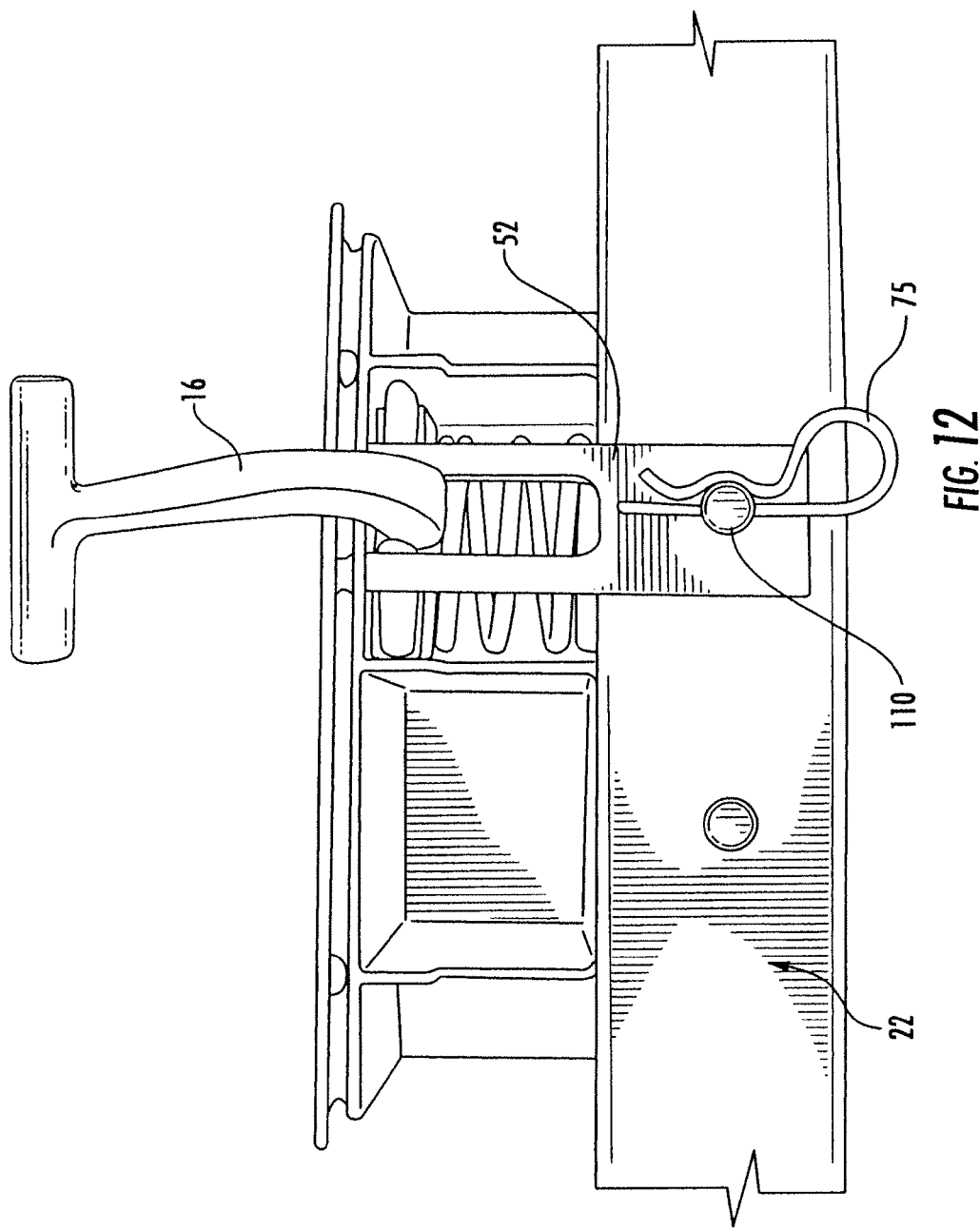
FIG. 12 is a rear perspective view showing another embodiment of the conveyor belt cleaner according to the present invention.
Figure 13:
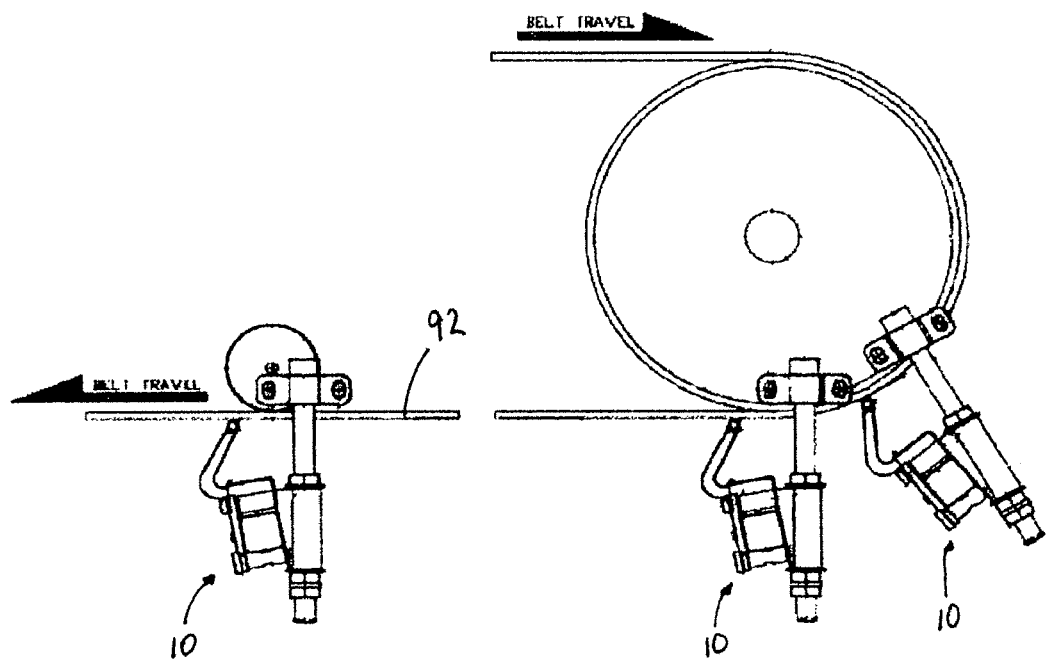
FIG. 13 is a partial elevated view of a conveyor belt assembly showing use of a conveyor belt cleaner according to the present invention in both primary and secondary positions.

The support frame members are composed of tubular lengths of material having a square cross-section. In one embodiment, each support frame member may be constructed of a double angle material, spaced apart to provide adequate flexural and torsional strength, without a conventional continuous support frame disposed below the scraper blades. However, support frame members with alternative cross-sectional shapes, e.g. circular, or alternative materials may be used. Further, as shown in FIG. 12, it is appreciated that a continuous support frame member may be used with the present invention.

A substantially C-shaped cross member 30 extends between the support frame members. As is seen in FIGS. 1-4, the cross member 30 comprises a back wall 32 and first and second substantially perpendicularly extending arms 34, 36 that define a receiving area 38 configured to receive the support frame member 24. The first arm 34 also serves as a shelf for the mounting assembly 14, as will be described in detail below. The support frame members 24, 26 may be welded into place, or be attached using other known means, within the receiving area 38.

Figure 2:
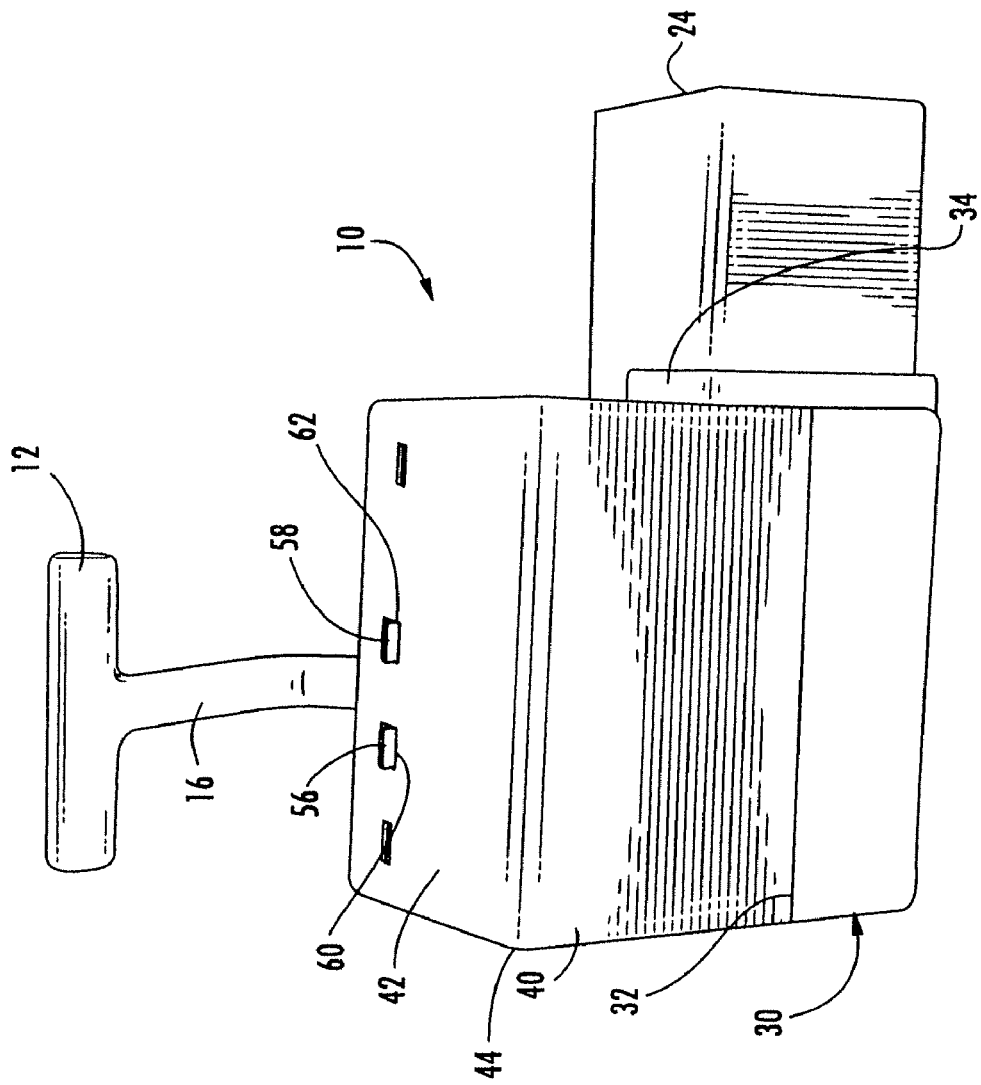
FIG. 2 is a front perspective view of a conveyor belt cleaner according to the present invention.
Figure 3:
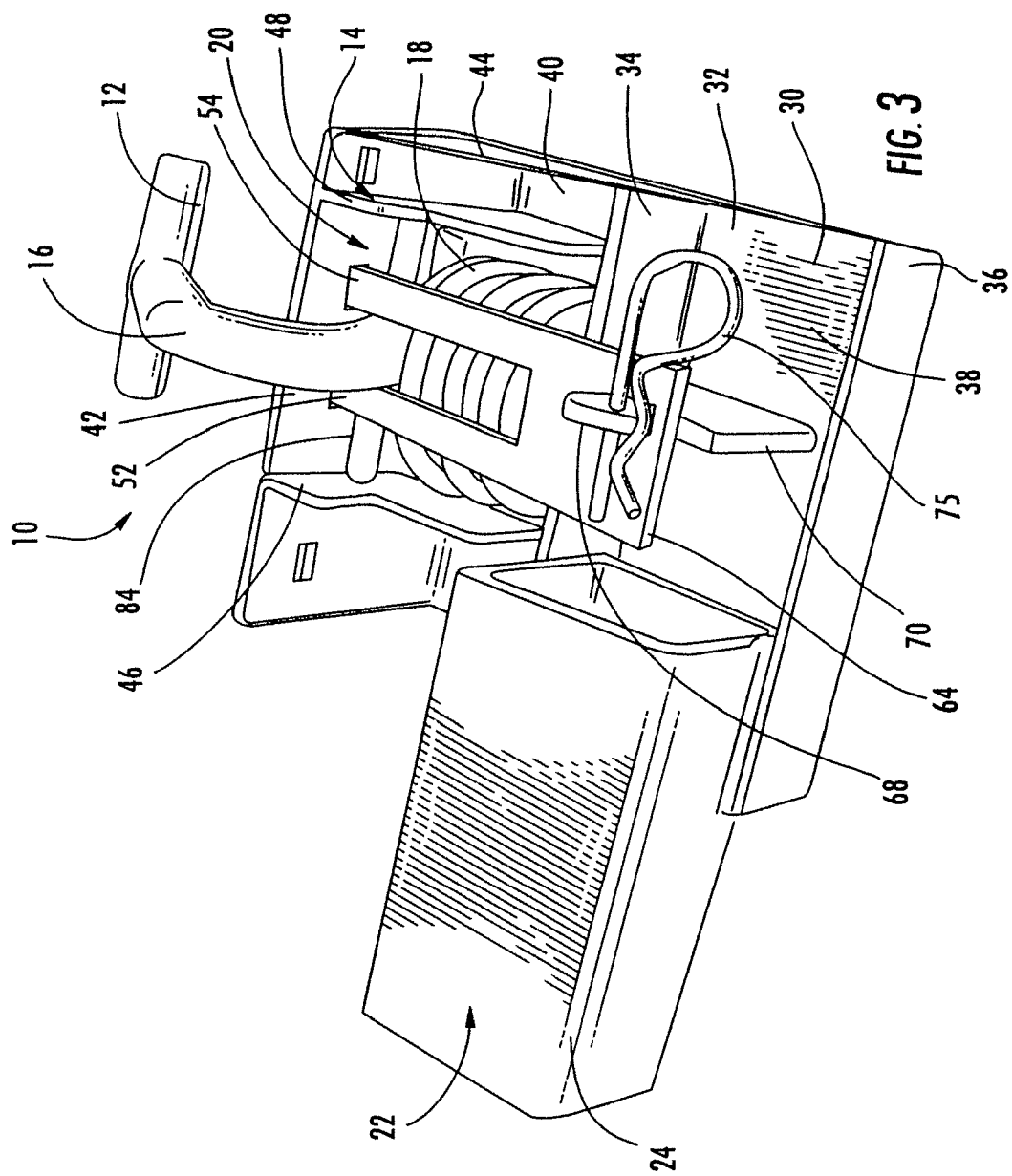
FIG. 3 is another rear perspective view of a conveyor belt cleaner according to the present invention.
Figure 4:
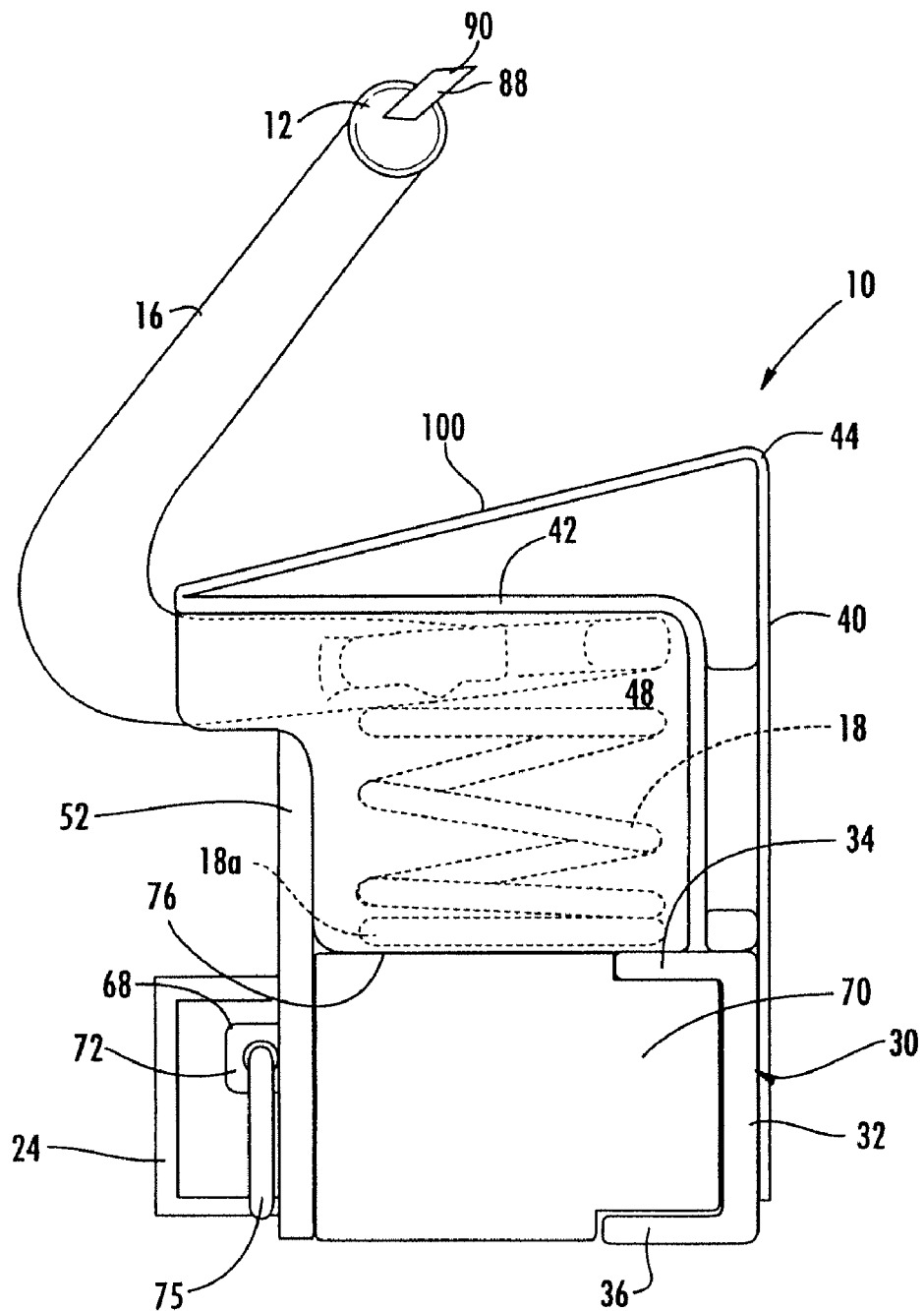
FIG. 4 is a side elevation view of a conveyor belt cleaner according to the present invention.

As is shown in FIG. 2 (which omits the cover plate 100 of FIG. 1), a back plate 40 extends upwards from the arm 34 in a substantially parallel direction to the back wall 32. It is also appreciated that the back plate may be mounted to the back wall 32. A top plate 42 extends in a substantially perpendicular direction from the back plate 40. A round corner portion 44 separates the back plate 40 and top plate 42. In the embodiment shown in FIG. 2, the back plate 40 and top plate 42 are integrally formed from a single sheet of material. However, these components could be formed from separate pieces of raw material and joined together by any suitable means such as, but not limited to, welding.

A first and second partition 46, 48 extend between the top plate 42 and first extending arm or shelf 34 and extend from the back plate 40 forward. Together back plate 40, top plate 42, shelf 34 and partitions 46, 48 form a pocket 20 for receiving a biasing member 18 and the base member 82 (FIGS. 5-6) of the scraper blade arm 16. A removable closure gate 52 extends across part of the front of the pocket 20. In order to reduce buildup of contaminates that may adversely affect the biasing member 18 or operation of the conveyor belt cleaner, in one embodiment, the first extending arm 34, top plate 42 and partitions 46,48 define open areas on the bottom of the pocket (i.e., above the first extending arm 34 and opposite the top plate 42) and the front of the pocket (i.e., opposite the back plate 40 and around the closure gate 52). In operation, the open areas in the pocket provide a passageway for materials and contaminates from the conveyor belt scraping process or otherwise to pass through the pocket rather than accumulate therein. As shown in the figures (such as FIG. 10), the back plate 40 may be offset from the back wall 32 of the C-shaped cross member, thereby creating a larger opening at the bottom of the pocket 20.

Figure 11:
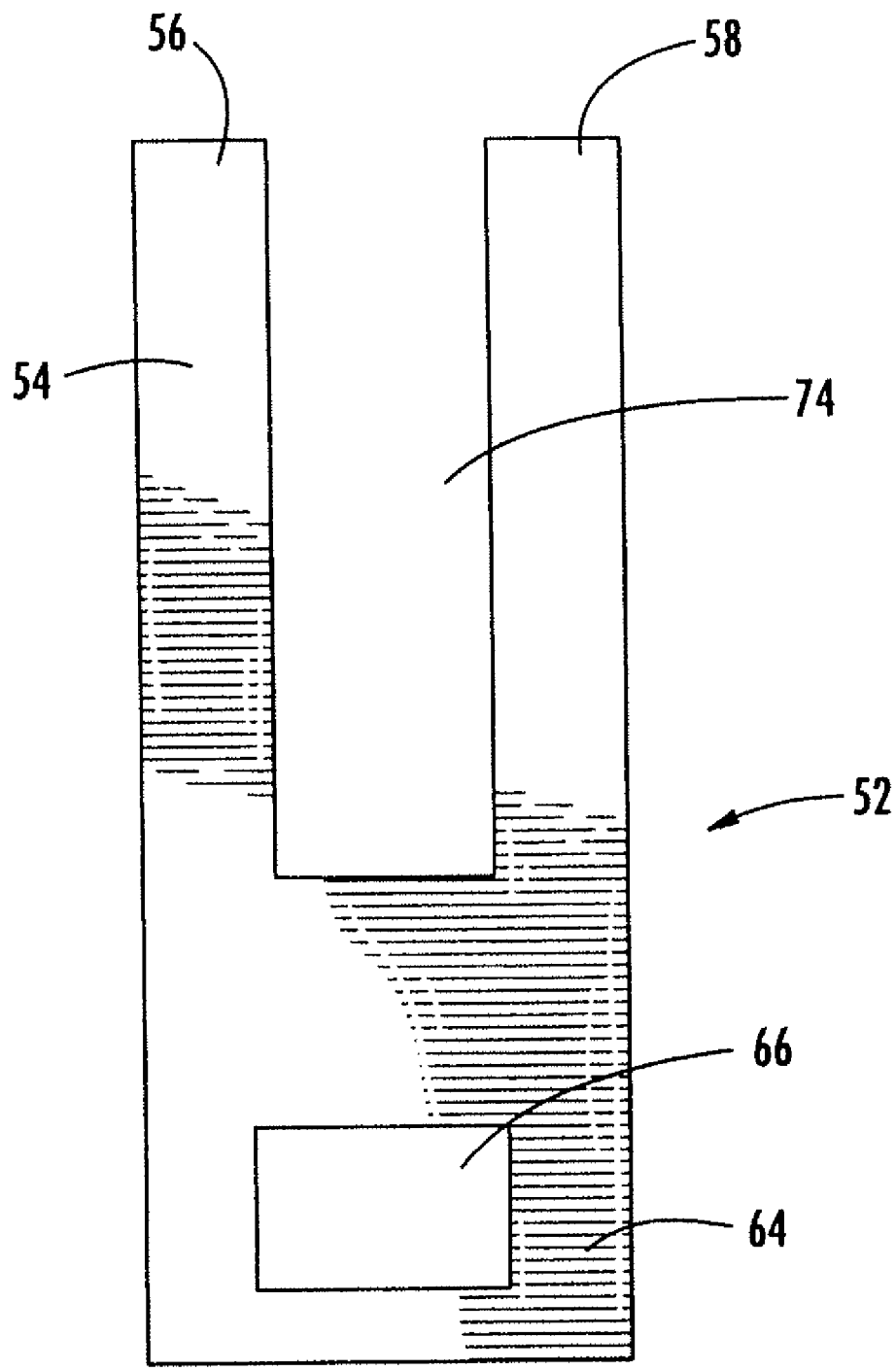
FIG. 11 is a front elevation view of a closure gate of the conveyor belt cleaner according to the present invention.

As seen in FIG. 11, the closure gate 52 comprises a first end 54 having a first and second mounting prong 56, 58 and configured to be received by corresponding apertures 60, 62 (FIG. 2 shown without a cover plate 100) disposed in the top plate 42 to secure the first end 54 of the closure gate in place. The second end 64 of the closure gate 52 comprises a mounting aperture 66 for receiving a mounting prong 68 (FIG. 1) that extends from an anchor member 70. The mounting prong 68 includes an aperture 72 for receiving a fastener 75 such as, but not limited to, a cotter pin (as seen in FIG. 1), peg, screw or any other suitable fastener. When the fastener 75 is in place and retained by the aperture 72, the second end 64 of the closure gate 52 is held in place. The closure gate 52 further comprises a slot 74 that extends generally linearly along the length of the closure gate 52, and that is configured to receive, enable passage there through, and enable displacement therein of the scraper blade support arm 16. In this arrangement, the pocket 20 remains relatively open, allowing for material cleaned from the conveyor belt surface 92 to freely pass through the pocket 20 without accumulating and adversely affecting the performance of the conveyor belt cleaner 10. If a continuous support frame is used, as shown in FIG. 12, the top of the support frame may include one or more nodes 110 having apertures (not shown) there through for receiving a fastener 75 (e.g., a cotter pin) to retain the second end of the closure gate 52.

Referring again to FIGS. 1 and 4, the conveyor belt cleaner 10 may also include a cover plate 100 that extends over the top plate 42 and back plate 40. The cover plate includes at least a top 102 and side 104 that are preferably angled to reduce the tendency for material to build up on the surfaces of the conveyor belt cleaner 10 during use. In one embodiment, when the conveyor belt cleaner is installed with the proper tilt, the surfaces of the cover plate may extend at about 45 degree angles relative to the downward gravitational force. The cover plate 100 may be welded into place, or be attached using other known means, to, among other parts, the top plate, back plate and/or C-shaped cross member.

The anchor member 70 is disposed with the receiving area 38 of the cross member 30 and extends from the back wall 32. A flange portion 76 along the top edge of the anchor member 70 extends beyond the shelf 34 and forms a level extension of the shelf 34 to partially seat the biasing member 18, as is described in detail below.

As previously disclosed, each pocket 20 is configured to receive and house a biasing member 18, where the bottom of the biasing member 18a seats on the shelf 34 and flange portion 76 of the anchor member 70. In the embodiment shown in the drawings, the biasing member 18 comprises a coil spring having a first and second end 18a, 18b and a longitudinal axis 118 extending there between. The coil spring 18 is pre-compressed prior to its introduction within the pocket 20 to apply a scraping force through a scraper blade arm 16 to a corresponding scraper blade 12, as will be described in greater detail below. In the preferred embodiment of the present invention, the ratio of the compressed spring length and spring diameter is approximately 1:1.

In another embodiment, the biasing member may comprise a pad of resilient elastomeric material having a retarded resilience. The biasing member may also comprise a resilient tubular member that may be placed with a latitudinal orientation within the pocket 20. In order to add a further biasing resiliency, a resilient sphere may be contained within the tubular member.

Figure 5:
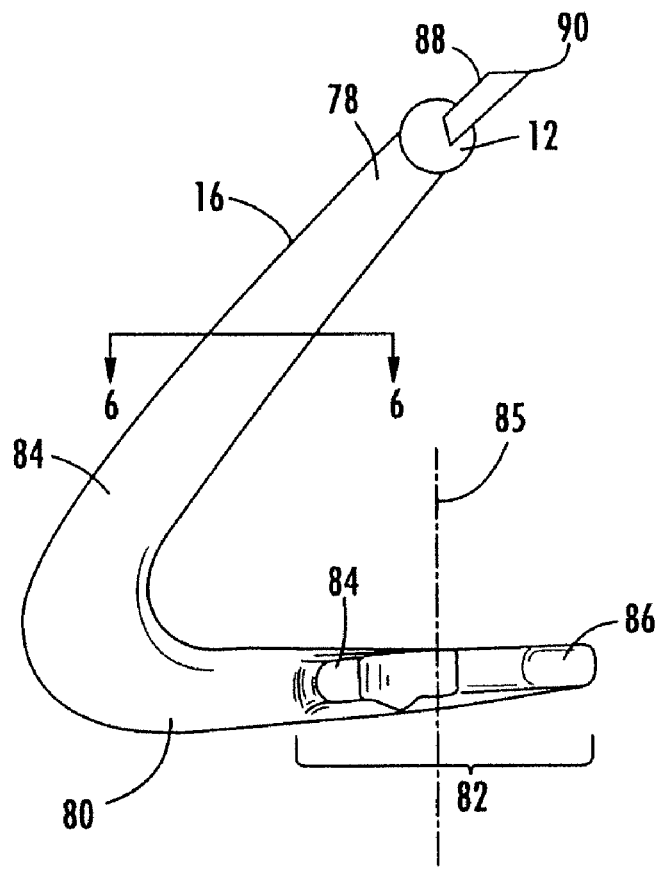
FIG. 5 is a side elevation view of a scraper blade arm of a conveyor belt cleaner according to the present invention.
Figure 6:
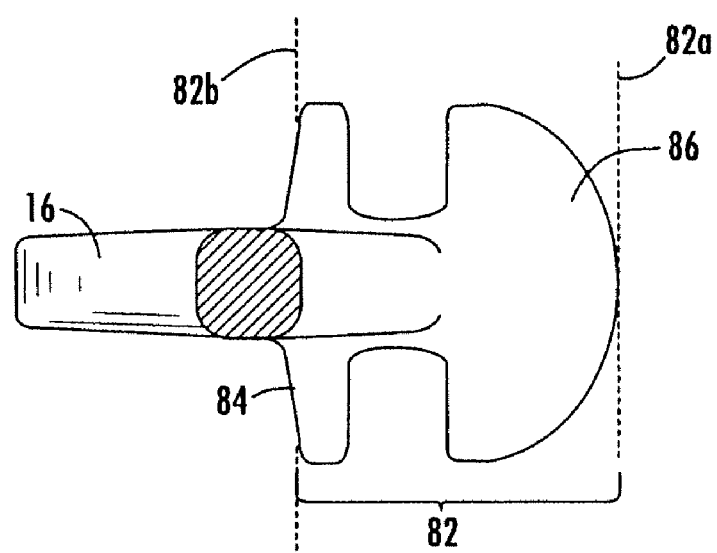
FIG. 6 is a cross-section view of the scraper blade arm shown in FIG. 5, taken along line 6-6 in FIG. 5.

Referring to FIGS. 5 and 6, each scraper blade arm 16 is substantially C-shaped and comprises a first end 78 associated with a scraper blade 12, a second end 80 that extends through the slot 74 in the closure gate 52 and terminates at a base member 82, and an arcuate mid-section or elbow 84 interconnecting the first and second ends 78, 80. The base member 82 comprises a generally linearly extending member 84 disposed substantially perpendicular to the second end 80 and a semicircular, generally planar member 86. The linearly extending member 84 is configured to overlay the rear portion 18c (FIG. 7) of the biasing member 18 and is dimensioned to span substantially the entire width of the pocket 20 (FIG. 3), while the generally planar member 86 is configured to overlay the front portion 18d of the biasing member 18. As shown in FIG. 6, the base member 82 comprises two sets of generally linear, opposing edges, including a front edge 82a at the apex of the generally planar member 86, rear edge 82b extending through the linearly extending member 84 and side edges extending generally perpendicular to the front and rear edges 82a, 82b. As is shown in FIG. 5, the scraper blade 12 is positioned substantially in line with the midline 85 of the base member 82. In this arrangement, the deflection force on the scraper blade and base member is greater in the direction of the belt travel than from side-to-side. This will reduce excess forces on the blade edge on irregular belt surfaces and ensure almost even force across the blade when applied to an uneven belt surface.

Figure 15:
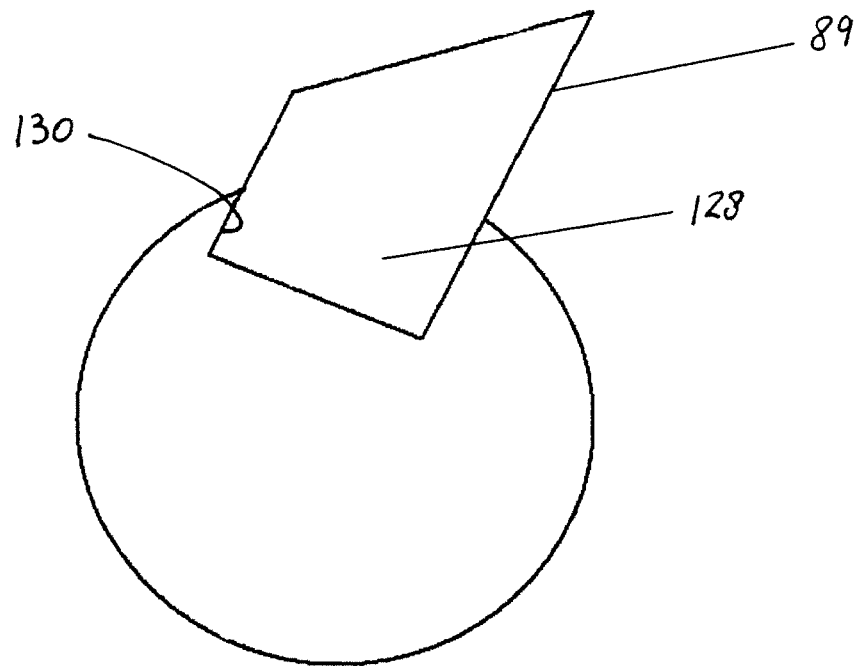
FIG. 15 is a partial elevated view showing an insert member in a first position in the end of the scraper blade arm wherein the blade presents an obtuse angle to the conveyor belt.
Figure 16:
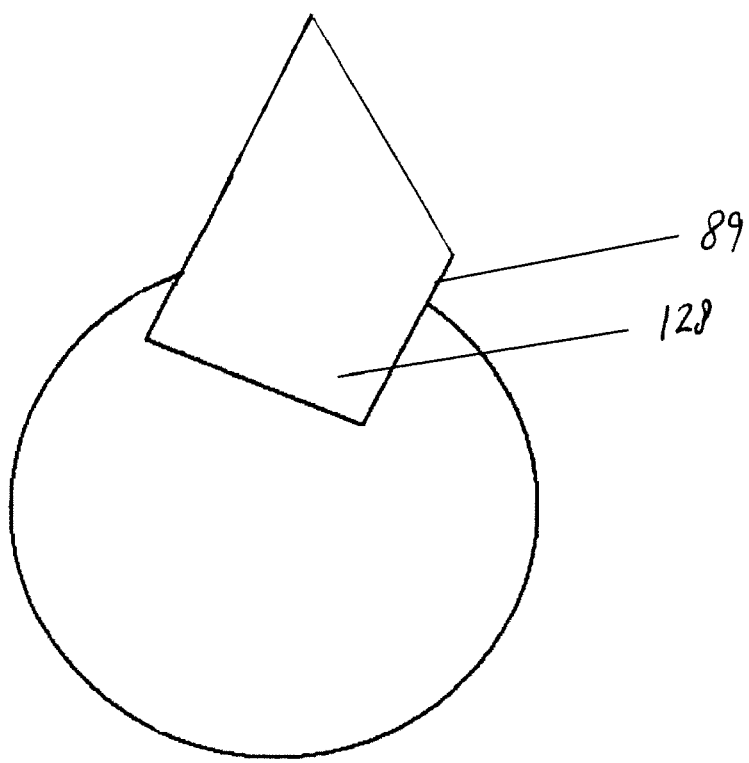
FIG. 16 is a partial elevated view showing the insert member in a second position, wherein the blade presents an acute angle to the conveyor belt.

The scraper blade 12 includes a scraping element 88 having a scraping edge 90. The scraping element 88 may also include an insert member 89 (FIG. 15) having the scraping edge 90. The scraping element 88 or insert member 89 may be made from a wear-resistant material such as tungsten carbide, alumina ceramics, steel faced with polycrystalline diamonds, or the like. The scraping element 88 or insert member 89 may alternatively be made from an elastomeric material such as urethane. The scraper blade 12 as shown herein is configured to scrape the surface of a conveyor belt. However, this assembly may be used to mount scraper blades and scraping elements for other purposes, such as for scraping ice or snow from roadway surfaces. Referring to FIG. 15, the insert member 89 may be sized and shaped so that, when its base 128 is seated in an opening 130 in a first position, the scraper blade of the insert member provides a rake angle for scraping, and when the insert member is seated in the end of the scraper blade in a second position, the scraper blade provides a negative rake angle for peeling. In one embodiment, the rake angle in the first position is a rake angle for cleaning of 5 to 10 degrees, and the rake angle in the second position provides a positive rake angle of 15 to 20 degrees.

Referring again to FIGS. 1 and 7, to assemble the conveyor belt cleaner 10, the base member 82 of a scraper blade arm 16 is positioned within a pocket 20, a biasing member 18 is pre-compressed and positioned within the same pocket 20 with the first end 18a of the biasing member seated on the shelf 34 and flange portion 76 of the anchor member 70 and the second end 18b of the biasing member abutting the base member 82 of the scraper blade arm 16. The amount of compression initially provided to the biasing member 18, and the resulting scraping force provided by the biasing member 18 to the base member 70, will vary depending upon the scraping application for which the conveyor belt cleaner will be utilized. Finally, the closure gate 52 is secured into position to prevent the biasing member 18 from escaping the pocket 20.

Figure 7:
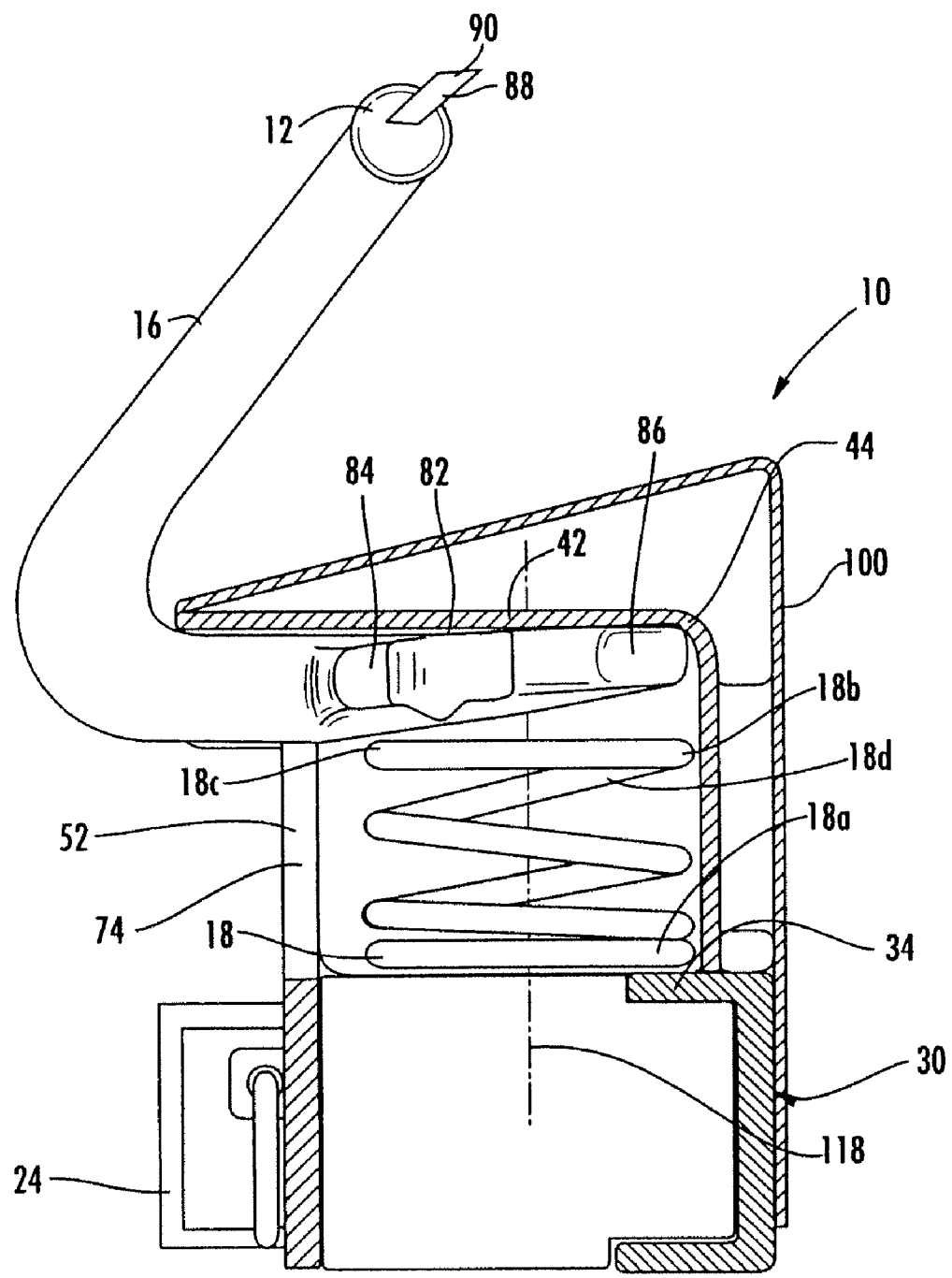
FIG. 7 is a partial cross-section elevation view of a conveyor belt cleaner according to the present invention.

FIGS. 7-10 show the conveyor belt cleaner 10 of the present invention in operation. FIG. 7 shows the first, pre-load stage where the scraper blade 12 is not yet in scraping engagement with the conveyor belt surface 92. At this stage, the biasing member 18 exerts a conventional linear force along its longitudinal axis 118 on the scraper blade 12, through the base plate 82 and scraper blade arm 16. During the pre-load stage, the base member 82 is located adjacent and parallel to the top plate 42. In a preferred embodiment, the biasing member 18 is pre-loaded to exert approximately twenty pounds of force at the scraping edge 90 at the point of engagement with the belt 92 in the pre-load stage.

Figure 8:
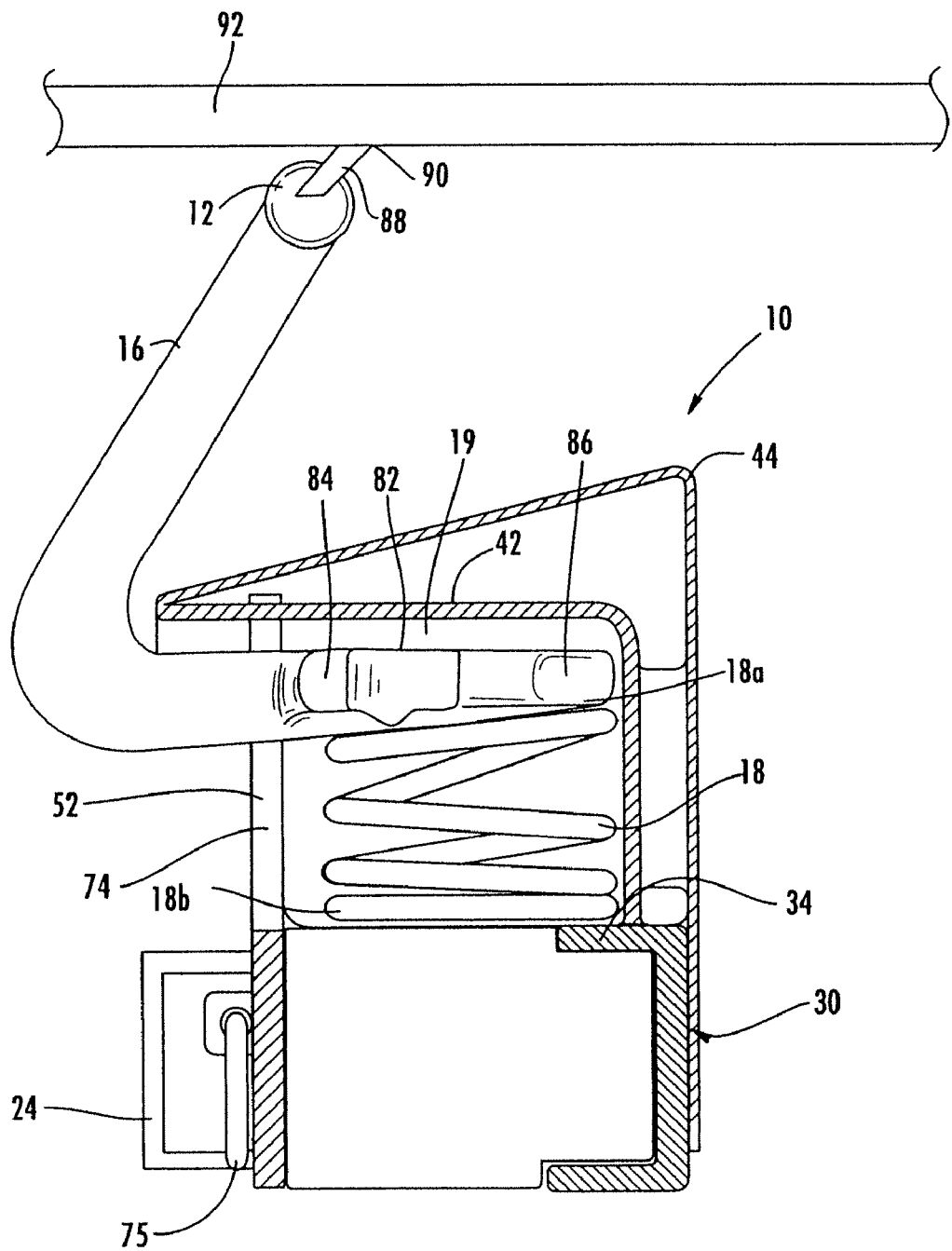
FIG. 8 is a partial cross-section elevation view of a conveyor belt cleaner according to the present invention showing the blade engaged with the surface of a conveyor belt.

Referring to FIG. 8, the vertical displacement of the conveyor belt cleaner is adjusted through the use of jackscrew assemblies (not shown) on opposing sides of the support member 22. Because the scraper blade 12 is substantially aligned with the midline 85 of the base member 82 (FIG. 5), the initial displacement of the biasing member 18 when the scraper blade 12 first engages the conveyor belt surface 92 will be along its longitudinal axis 118 (FIG. 7). The additional compression creates a small space 19 within the pocket 20 between the base member 82 and the top plate 42 that enables pivoting of the base member 82 as will be described in detail below.

Figure 9:
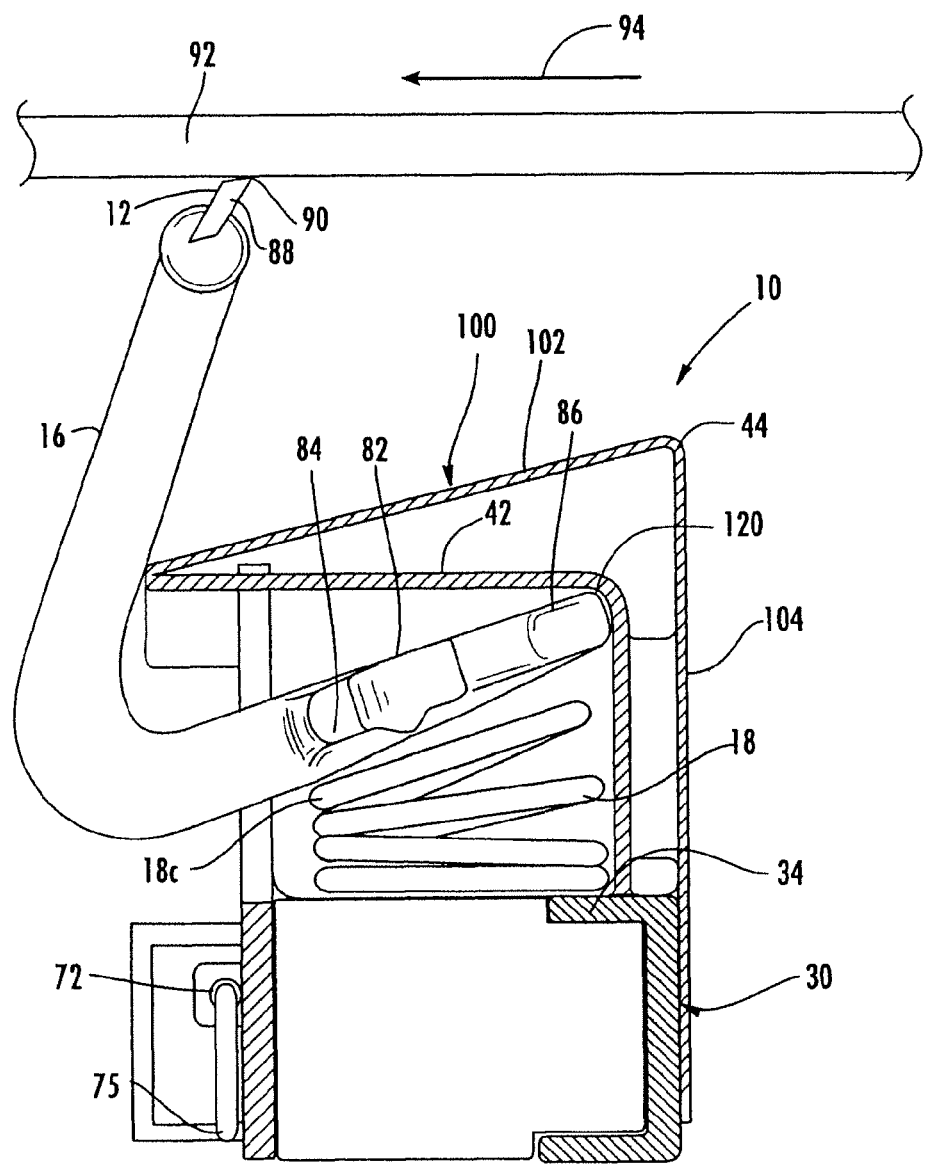
FIG. 9 is a partial cross-section elevation view of a conveyor belt cleaner according to the present invention illustrating the movement of the scraper blade arm and the spring during operation.

As is shown in FIG. 9, when the scraping edge 90 of the scraper blade 12 is in scraping engagement with the conveyor belt surface 92 that is moving in a forward direction as shown by the arrow 94, the scraper blade 12 will pivot from the first position, as shown in FIG. 8, about a pivot axis 120 at the front edge 82a of the member 86 that is generally parallel to the central axis 25 of the support frame 22, to a second position, shown in this Figure. The scraper blade arm 16 will thereby move downwardly within the slot 74 and the member 84 will be forced to pitch downwardly into the biasing member 18, such that the linearly extending member 84 compresses the rear portion 18c of the biasing member 18. The resilient properties of the biasing member 18 exert a reengagement force on the linearly extending member 84 that will bias the scraper blade arm 16, and in turn the scraper blade 12, in a clockwise direction about the pivot axis 120 at the front edge 82a of the generally planar member 86 to maintain scraping engagement with the conveyor belt surface 92.

Figure 10:
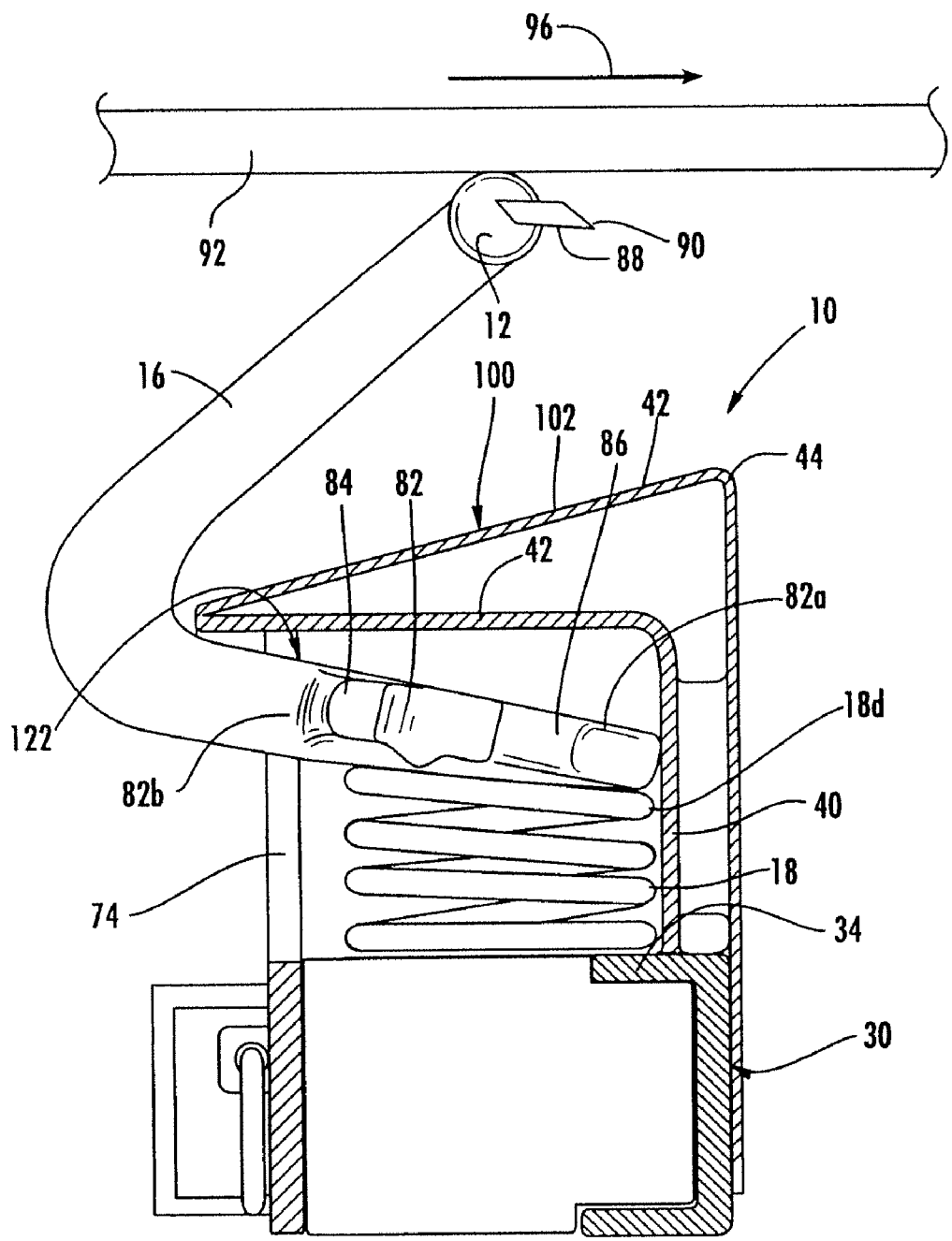
FIG. 10 is a partial cross-section elevation view of a conveyor belt cleaner according to the present invention showing the movement of the scraper blade arm and the spring during operation.

If the direction of movement of the conveyor belt is reversed to the direction of the arrow 96, as shown in FIG. 10, the conveyor belt surface 92 will force the scraper blade 12 and scraper blade arm 16 to pivot in a clockwise direction from the second position, as shown in FIG. 9, to a third position, seen in this Figure, about a pivot axis 122 located at the rear edge 82b of the linearly extending member 84. The reversal of the belt cleaner surface 92 may be the result of reversing the forward movement of the conveyor belt surface or stopping the movement of the conveyor belt where the conveyor belt will either stretch or when the conveyor is on an incline, the load on the conveyor belt will cause roll back in the belt. Movement to this third position prevents damage to or destruction of the scraping edge 90 and conveyor belt surface 92.

The pivoting of the scraper blade 12 and scraper blade arm 16 in a clockwise direction will force the front edge 82a of the generally planar member 86 to pitch downwardly into the front portion 18d of the biasing member 18, compressing the front portion 18d of the biasing member 18. The pivot axis 122 of the rear edge 82b of the linearly extending member 84 is generally parallel to the central axis of the support frame 22. The resilient properties of the biasing member 18 exert a reengagement force on the generally planar member 86 that will bias the scraper blade arm 16, and in turn the scraper blade 12, in a counter-clockwise direction about the pivot axis 122 at the rear edge 82b of the linearly extending member 84 to maintain engagement of the scraper blade 12 with the conveyor belt surface 92. When the direction of the conveyor belt surface 92 is again reversed to the forward direction, as shown in FIG. 9, the scraper blade 12 and scraper blade arm 16 will pivot in a counterclockwise direction back to the position as shown in FIG. 9.

The configuration of the conveyor belt cleaner 10 of the present invention enables the compression of only a portion of the biasing member once the biasing member is pre-compressed to exert the desired scraping force. Further compression of the biasing member at either the front portion 18d or rear portion 18c, decreases the rate of compression of the biasing member 18 as compared with further compression of the spring in a direction parallel to the longitudinal axis 118 of the biasing member. Because the rate of compression is decreased, the scraping force exerted by the biasing member can be maintained at a substantially constant level, even as the scraper blade 12 is deflected by an obstruction on the conveyor belt surface 92. This reduces the fluctuations in the scraping force exerted on the scraper blade 12 and conveyor belt surface 92 and reduces destructive vibrations in the biasing member 18, as well overloading of the scraper blade 12 and scraping edge 90.

The contact point of the scraper blade 12 to the conveyor belt surface 92 moves along an flattened arced path as it moves from the first position to the second position, and then to the third position, pivoting or rotating about a first, pitch axis that is generally horizontal and parallel to the central axis 25 of the support frame 22. In one embodiment of the present invention, the biasing member 18 is pre-compressed such that the additional force loading of the biasing member in a direction at an angle to the biasing member axis 118 results in the contact point traveling through an arc of at least one inch resulting in the contact point being at least ½ inch lower than the plane of the apex of the arc at the ends of the path, with minimal or no change from the pre-load force exerted by the biasing member 18. As the conveyor belt direction is reversed, the biasing member 18 will also experience additional, temporary force loading in a direction parallel to the longitudinal axis of the biasing member that enables the scraper blade 12 to travel along the arced path without causing damage to the scraping edge 90 and conveyor belt surface 92.

As has been shown in FIGS. 1-11 and described herein, the biasing member 18 enables the base member 82, scraper blade arm 16, and scraper blade 12 to pivot about a first, pitch axis that is parallel to the central axis of the support frame 22. However, the configuration of the present inventive conveyor belt cleaner also enables the base members, scraper blade arms, and scraping elements to pivot about a second, roll axis that is generally horizontal and perpendicular to the central axis 25 of the support frame 22. The base member 82, scraper blade arm 16 and scraper blade 12 also have a limited ability to pivot about a third, yaw axis that is vertical and perpendicular to the central axis of the support frame 22. Pivoting of the base member 82 about the yaw axis is limited by the ends of the linearly extending member 84 encountering and abutting the partitions 46, 48 defining the pocket.

In the manner described above, the conveyor belt cleaner 10 provides for full circle deflection of the base member 82, scraper blade arm 16, and scraper blade 12. In addition, because the biasing member 18 may be further loaded along the longitudinal axis 118 of the biasing member 18, the point of rotation of the base member 82, scraper blade arm 16 and scraper blade 12 floats. This floating point of rotation f (illustrated at one point 120 in FIG. 9) reduces vibration in the biasing member that, when translated through the base member and scraper blade arm, can cause damage to the scraper blade and conveyor belt surface.

In operation of one embodiment of the present invention, when the base member is deflected, the rear edge 82b of the linearly extending member 84 and the front edge 82a of the generally planar member 86 will frictionally engage either the closure gate 52 or the top plate 42, respectively. Accordingly, the force necessary for an event to cause the scraper blade arm 16 to rotate or move away from the belt surface 92 is the resultant force of the spring 18 plus the friction between the linearly extending member 84 or the generally planar member 86 and the closure gate 52 and top plate 42. When the event passes, the friction between the members 52 and the top plate 42 the pocket retards the motion of the scraper blade arm on its return to a cleaning position. If a larger frictional force is desired to retard the motion of the scraper blade to a return position, it is appreciated that material having a higher coefficient of friction may be used for the base member and/or partitions, bottom plate and/or closure gate. It is also appreciated that the linearly extending member 84 and part of the generally planar member 86 may be sized so that they frictional engage the partitions 46,48 of the pocket 20 when the base member is deflected.

The ability of individual biasing members to be loaded independent of each other enables the scraper blades of the conveyor belt cleaner of the present invention to engage the conveyor belt across the entire width of the conveyor belt, regardless of the amount of wear exhibited at various points on the conveyor belt or other areas where the belt surface contour is not uniformly linear. Normal wear of the conveyor belt surface usually occurs at a faster rate towards the center of the belt, with variances in depth of the conveyor belt ranging from ⅛ to ⅜ of an inch.

As the present conveyor belt cleaner 10 is elevated into position, the scraper blades on the outside edges will engage the exterior or peripheral portions of the conveyor belt surface before the scraper blades on the inside of the conveyor belt cleaner 10 engage the worn, interior portion of the conveyor belt surface. As the conveyor belt cleaner continues to elevate into position, the assemblies where the scraper blades engage the belt surface first will deflect about the pitch axis as the interior blades are raised into position. In addition, the interior scraper blades will deflect about the roll axis to account for the uneven surface of the conveyor belt, with the edges of the scraper blades towards the center of the conveyor belt tipping upwards. Due to the ability of the individual scraper blades to deflect independent of each other, such variations in the level of the conveyor belt surface 92 can be taken up as the conveyor belt cleaner 10 is elevated into position without any additional significant force loading on the biasing member 18 in a direction parallel to the biasing member axis.

As a result of the full circle deflection, if the scraping edge 90 encounters an obstruction on the conveyor belt surface 92, the base member 82, scraper blade arm 16 and scraper blade 12 will pivot or deflect along the pitch axis, roll axis, or, to some degree, along the yaw axis, and then deflect back into scraping engagement with the conveyor belt surface 92. If the obstruction is a mechanical splice on the surface of the conveyor belt as the conveyor belt moves in the direction as indicated in FIG. 9, the linearly extending member 84 will pivot counterclockwise about the front edge 82a of the generally member 86, causing the scraping edge 90 to rotate away from the conveyor belt surface 92 to allow the obstruction to pass beyond the scraping element. The biasing member 18 will then resiliently bias the linearly extending member 84 to pivot about the front edge 82a in a clockwise direction with a reengagement force, until the scraping edge 90 again engages the conveyor belt surface 92. This reengagement force is substantially equal to the scraping force originally provided by the biasing member 18. As set forth above, the friction force between the linearly extending member and the closure gate or the generally planar member and the back plate will retard the motion of the scraper blade (and thus the scraper blade arm and base member) to its initial or start position.

If the scraping edge 92 encounters a point load obstruction on the conveyor belt surface 92, the base member 82, and in turn scraper blade 12, will rotate along the pitch axis, roll axis, or a combination of rotation about both the pitch and roll axes. The base member 82 and scraper blade 12 may also slightly rotate about the yaw axis as well. However, it is desirable to limit rotation about the yaw axis to prevent the scraping blade 12 and scraping edge 90 from twisting into the direction of belt travel, which can damage the conveyor belt surface 92 as well as result in uneven wear of the scraping edge 90.

Another feature of the preferred embodiment of the present invention is its ability to be used as both a primary belt cleaner and as a secondary belt cleaner, as a result of the full circle deflection capabilities. Referring again to FIG. 13, conveyor belt cleaners are illustrated as being mounted relative to the conveyor belt in both primary and secondary positions. It is appreciated that the conveyor belt cleaners may be bolted or otherwise attached to the pulley chute work (e.g., chute wall (not shown)) or other structures in a known way (e.g., bolts). When used as a primary belt cleaner, the scraping edge 90 will engage the conveyor belt surface 92 at a supported point of the belt, such as around the head pulley. When used as a secondary belt cleaner, the scraping edge will engage the conveyor belt surface 92 at an unsupported point of the belt such as the return portion. In both configurations, the initial motion of scraping edge 90 is tangential or in a direction substantially parallel to the direction of the conveyor belt travel at the point of engagement. As the blade arm continues to rock, the motion of the scraping edge 90 approaches a more perpendicular orientation with respect to the direction of travel of the belt.

Various features of the invention have been particularly shown and described in connection with the illustrated embodiments of the invention, however, it must be understood that these particular arrangements merely illustrate, and that the invention is to be given its fullest interpretation within the terms of the appended claims.

I claim:

1. A conveyor belt cleaner for cleaning material from the surface of a conveyor belt, the conveyor belt cleaner comprising:
   a support frame having a central axis extending there through;
   a scraper blade;
   a scraper blade arm having a first end associated with the scraper blade and a second end associated with a base member;
   at least a first mounting assembly operatively mounted to the support frame, the first mounting assembly including:
   a biasing member, wherein the base member is configured to overlay the biasing member to exert a scraping force to urge the scraper blade into scraping engagement with the conveyor belt; and
   a cavity configured to receive and retain the biasing member, the cavity defined by four sides, a top and a bottom, wherein at least two of the four sides, top and bottom provide a passage to enable material cleaned from the conveyor belt to pass there through.

2. The conveyor belt cleaner of claim 1, wherein the cavity is defined by a top plate, two opposing side plates, and a back plate, the biasing member includes a lower portion, and the biasing member is received and substantially enclosed by the cavity, the bottom of the cavity being defined by a flange which extends under only a portion of the lower portion of the biasing member, thereby forming an exit passage in the back side for debris.

3. The conveyor belt cleaner of claim 1, wherein the front side of the cavity is partially covered, and includes the slot, whereby an exit passage is formed in the front side for debris.

4. The conveyor belt cleaner of claim 1 which further comprises a cover plate associated with the mounting assembly to deflect material away from the mounting assembly.

* * * * *